US005345533A

United States Patent [19]

Tarrant et al.

[11] Patent Number: 5,345,533

[45] Date of Patent: Sep. 6, 1994

[54] PHOTOEMISSION RADIANT HEATER

[75] Inventors: Sidney A. Tarrant, Ballston Spa, N.Y.; Donald L. Reid, Hendersonville, Tenn.

[73] Assignee: United Optics Technology, Inc., Schenectady, N.Y.

[21] Appl. No.: 811,693

[22] Filed: Dec. 20, 1991

Related U.S. Application Data

[63] Continuation-in-part of Ser. No. 627,741, Dec. 14, 1990, abandoned.

[51] Int. Cl.$^5$ .............................................. H02J 17/00

[52] U.S. Cl. .................................... 392/356; 392/423; 392/440

[58] Field of Search ............... 126/450, 443, 441, 436; 250/492.1, 455.1; 392/354, 355, 356, 357, 407, 410, 416, 422, 423, 440

[56] References Cited

U.S. PATENT DOCUMENTS 1,923,083 8/1933 Fisher .................................. 392/355
3,104,307 9/1963 Garofalow et al. ............ 392/355 X
4,132,221 1/1979 Orillion .............................. 126/441
4,993,403 2/1991 Down ................................ 126/441

*Primary Examiner*—Henry A. Bennet
*Attorney, Agent, or Firm*—Heslin & Rothenberg

[57] ABSTRACT

A photoemission radiant heater includes a chamber having an interior reflective surface, a first end and a second end; a means for generating photons within the chamber wherein photons are reflected off the interior reflective surface of the chamber; a black body means having a portion thereof located in a position to absorb radiant energy from within the reflective chamber; means for blowing air over the black body means wherein heat is transferred from the black body means to the air. A means for concentrating photons such as a lens or convex reflective shield may be included within the chamber and the black body means may be located either within the core of the chamber, or at a first end of the chamber where it may or may not contain a plurality of members which extend out of the chamber axially along the length of the chamber. Air is blown over the black body means to absorb energy therefrom.

15 Claims, 6 Drawing Sheets

PHOTOEMISSION RADIANT HEATER

This application is a continuation-in-part of application Ser. No. 07/627,741, filed on Dec. 14, 1990, now abandoned.

FIELD OF THE INVENTION

The subject invention is directed to a heater, and more particularly, to a photoemission radiant heater which utilizes the energy of reflected photons to heat air.

BACKGROUND OF THE INVENTION

The present invention involves a different concept and approach applied to heating and heating systems. The photoemission radiant heater in accordance with the principles of the present invention utilizes the phenomenons associated with radiant energy and its thermal propagation and various aspects of the energy coefficients generated in three separate stages. The resultant heat is transferred to a radiant state by the use of black bodies.

This invention has virtually no similarities to conventional heating systems or units and is the first to effectively use the photoelectric effect and black body radiation.

SUMMARY OF THE INVENTION

Briefly summarized, the present invention comprises in one broad aspect a photoemission radiant heater having a chamber with an interior reflective surface, a first end and a second end, a means for generating photons within the chamber wherein photons are reflected off the interior reflective surface of the chamber, a black body means having a portion thereof located in a position to absorb radiant energy from within the reflective chamber, and means for blowing air over the black body means wherein heat is transferred from the black body means to the air.

To increase effectiveness, the heater may also comprise a means for concentrating the generated photons which may include a lens or a convex reflective shield. As the photons pass through the lens or convex reflective shield, they are concentrated before being reflected by the interior reflective surface.

The black body means may be configured such that a first portion is located at the second end of the chamber and a second portion is located at the outside of the chamber. When air is blown over the black body means, it is heated by the black body means. The black body means may include one or more black bodies which are preferably made of steel, cast iron or aluminum and filled with a polymer by product to facilitate thermal emissivity at a reduced weight. The configuration of the black body means may be cylindrical and/or may include cylindrical members which extend axially outside of the chamber to increase the surface area.

In order to control the heater, the heater is provided with a means for controlling the amount of heated air exiting the chamber. This can be accomplished using a thermostat to control the activation of the means for blowing air and/or a means to control the volume of air blown by the means for blowing air.

The heater of the subject invention can be used to heat air by generating photons within the chamber and reflecting the generated photons from an interior reflective surface of the chamber. The photons contact a black body which is thus heated. Preferably, the air is circulated over the black body by a fan.

Heating is more efficient if the generated photons are concentrated, for example, using a lens or convex reflective shield. Heating is even more efficient if the heater is capable of storing the energy of the reflected photons, so that the air within the chamber can also be heated by the energy which is stored therein. Preferably, the storage of the energy of the reflected photons is accomplished using a black body.

The principles of the present invention therefore provide a photoemission radiant heater which is effective and clean in its operation. Furthermore, this is accomplished by addressing thermal radiation in a manner that couples a pure energy medium (light) with a strong interactive material and medium.

BRIEF DESCRIPTION OF THE DRAWINGS

These and other objects, features and advantages of the invention will be evident from the following detailed description when read in conjunction with the accompanying drawings where like reference numerals represent like elements and in which.

DETAILED DESCRIPTION OF THE INVENTION

Figure 1:
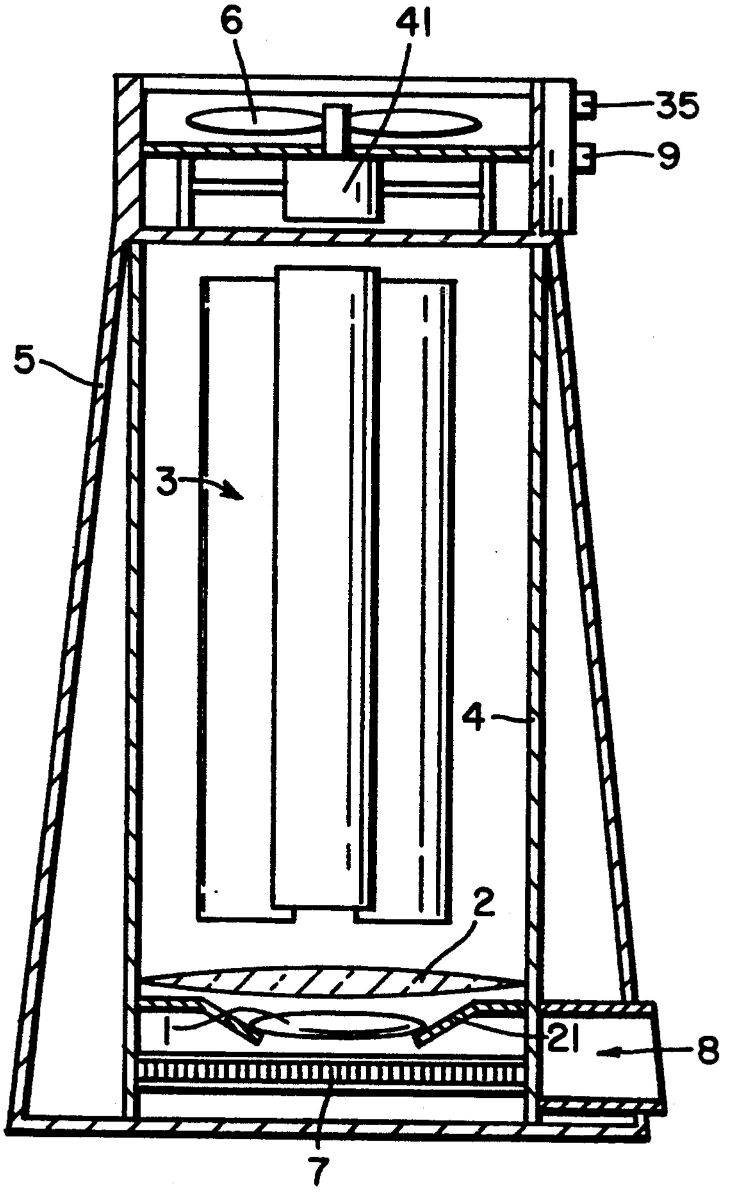
FIG. 1 is a sectional view of one embodiment of a photoemission radiant heater in accordance with the principles of the present invention.

Referring now to FIG. 1, where one presently preferred embodiment of the invention is illustrated, the heater in accordance with the invention includes a light of high lumens 1 located at the base of the heating unit. Located above the light assembly 1 is a lens 2 mounted on a frame 21 for supporting one or more convex lenses with varying radiuses for outerwall focusing. The number of lenses within the support frame 21 can vary based on desired operating requirements.

Located above the lens assembly 2 is a reflective chamber 4 which is the medium essential for photoemission and reflection of light beams. The chamber is preferably constructed of metal such as, for example, polished steel or aluminum. Other mediums can be used but optimum results require a high reflective ratio of 90% or better of the visible light wavelength. At the top of the reflective chamber 4 is a fan assembly 6 and motor 41. The air is pulled in by the fan unit 6 and forced downward into the reflective chamber 4 where it passes a black body means 3 at the core of the reflective chamber 4. Beams of light particles conjugate toward the center of the chamber after being reflected off the inner wall of the reflective chamber 4. The particular pattern of reflection is based on the radius of the reflective chamber 4. The energy generated from the light particles or photons is then absorbed by the black body radiator assembly 3. The air flow then passes to the base of the unit where a heat manifold 7 is located just below the light unit 1. The heat manifold 7 also absorbs a percentage of the thermal energy generated by the light source 1 due to its proximity to the light assembly 1 and its preferably anodized black color. The heated air then passes through the manifold 7 where it is exhausted through the base 8 vent 7. The heater is controlled by a thermostat 9 which activates the fan assembly at a particular temperature. A blower speed controller 35 controls the speed of the fan unit 6 to provide controlled thermal heating for environmental comfort.

Figure 2:
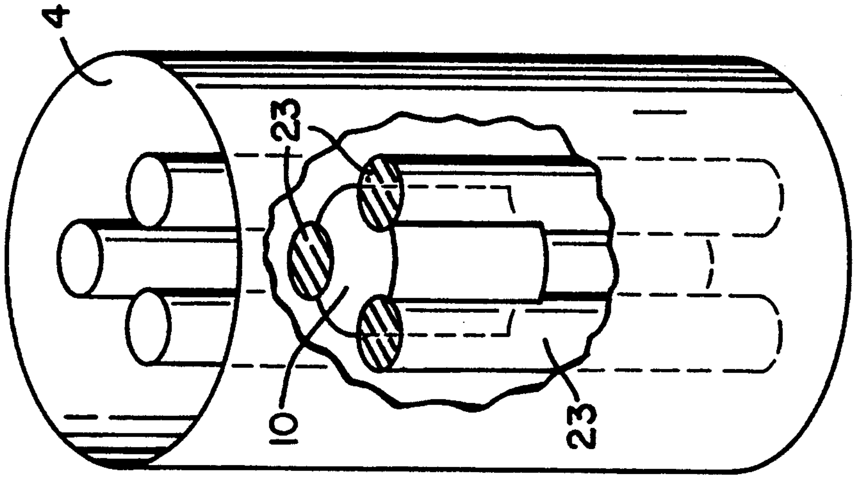
FIG. 2 is a schematic representation of the chamber and black body means shown in FIG. 1.

FIG. 2 further illustrates the heating technique utilized in accordance with the principles of the present invention. The reflective chamber 4 acts similar to an optical lens by reflecting and concentrating light particles to a specified area. The black body means 3 at the center of the reflective chamber may include polymer filled black bodies 23 assembled together by a connector 10. The light that is reflected strikes the black body assembly 3 and is absorbed therein. The concentrated energy raises the temperature of the black body means to level relative to the energy available for absorption.

Referring again to FIG. 1, a lens assembly 2 may be placed between the light source and black body means 3 to concentrate the light towards the black body means 3. The light passes through a lens assembly 2 which concentrates the light which will reflect off the wall of the metallic chamber 4 towards the black body means 3 at the center of the chamber. The reflective chamber 4 allows the radiant energy to remain stored as reflected light particles until it can be absorbed by the black body assembly 3. Preferably all potential radiant energy reaches the black body assembly 3. This may be accomplished by using a continuous concave medium as the reflective chamber 4 to enable reflection of all the radiant energy to the black body assembly 3. The chamber is preferably convex in design creating a 360 degree interior reflective surface. Preferably, the chamber is circular in perimeter. However, any cylindrical shape may suffice.

The black body means 3 may vary in geometry, material and shape. Illustrated in FIG. 2 are three tubular styled black bodies 23. The configuration of the enclosed black body means 3 is typically cylindrical and made up of several sub units 23 to increase the surface area. Preferably, the black body emits, in each part of the electromagnetic spectrum, the maximum energy obtainable per unit time from any thermal radiator based solely on its temperature. The black body may encompasses any energy absorbing and radiating medium. However, higher efficiency heating will result if a black body which absorbs all radiant energy should be used. The black bodies 23, which comprises the black body means, are preferably metallic with a vacuum sealed interior filled with a polymer based material. The black bodies quickly distribute thermal radiation throughout the entire assembly 3 thereby emitting thermal energy effectively and controlling heat transfer.

The heating technique in accordance with the principles of the present invention uses light as a means of generating usable thermal radiation. The photoemission heater utilizes focused and/or concentrated light particles in both the visible and infrared wavelengths. The light source 1 initiates the photoelectric effect by emitting photons which contact the reflective chamber 4 thereby stripping electrons from the surface of the heat chamber 4. The photoelectric effect occurs when a monochromatic beam of electromagnetic radiation illuminates the surface of a solid (or less commonly a liquid). Electrons are then ejected from the surface in the phenomenon known as photoemission or the external photoelectric effect. The kinetic energies of the electrons can be measured by means of a collector which is negatively charged with respect to the emitting surface on the reflective chamber 4. It is found that the emissions of these photoelectrons, as they are called, occurs immediately and is independent of the intensity of the light beam. Therefore photoemission occurs even when low intensity light is used as the light source.

The thermal energy of the heater is a direct result of the energy associated with the electrical resistive wattage used to source the light medium, and the propagation of radiant energy derived from the photoelectric effect and light particles focused by the reflective medium 4.

Figure 3:
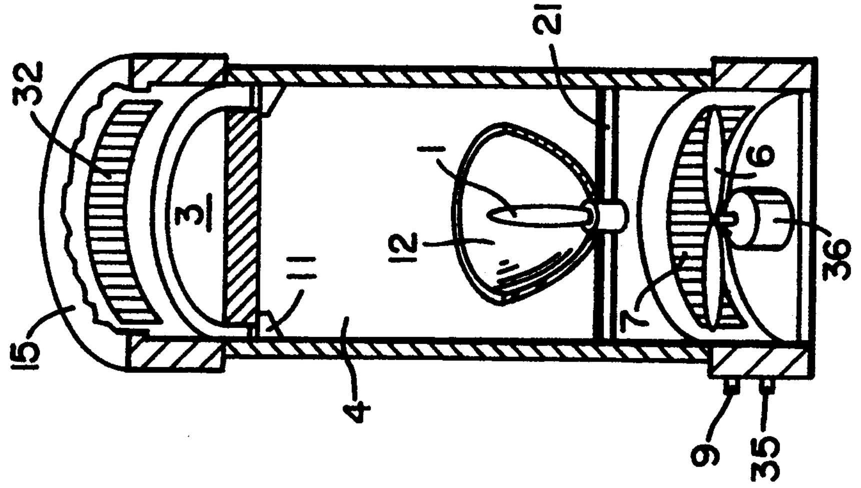
FIG. 3 is a cross sectional view of an alternate embodiment of the photoemission radiant heater depicted in FIG. 1.

FIG. 3 depicts an alternative embodiment of the radiant heater in accordance with the principles of the present invention. In this embodiment, a convex reflective shield 12 is used around the light source 1 to help reflect photons, and thus radiant energy, towards the upper portion of the reflective chamber 4. At the upper portion of the reflective chamber 4, the black body means 3 is located below a cap 15 having an upper manifold 32. The black body means 3 is supported by struts 11 which allow air to flow thereby. The black body means 3 absorbs the radiant energy from within the chamber 4 therein. In this configuration, the black body means 3 is not located within the core of the reflective chamber. This allows for maximum photon and radiant energy to be reflected off the interior surface of the reflective chamber 4 without obstruction by the black body means 3 therein. Accordingly, a higher rate of photon interaction with the interior reflective surface may be achieved thereby resulting in a higher efficiency heating. In this configuration, the fan or blower means 6 may be located at the lower portion of the heater unit towards the manifold 7. A motor 36 controls the fan 6. Air is forced through upper manifold 32 where it is heated by the black body means 3 and exhausted from the lower manifold 7 by the fan 6. A thermostat 9 and fan speed controller 3 are also included.

Figure 4A:
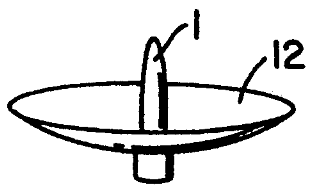
FIGS. 4A–4C depict alternate embodiments of a light source and convex reflective shield useable in the photoemission heater in accordance with the principles of the present invention.
Figure 4B:
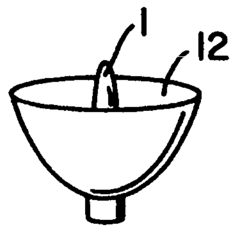
Figure 4C:
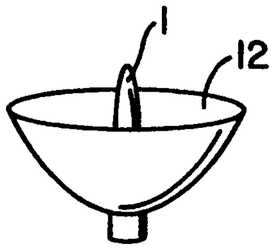

The convex reflective shield helps reflect photons towards the upper portion of the reflective chamber 4 towards the black body 3 so as to allow for maximum absorption of the radiant energy by the black body means 3 which then acts as a thermal radiator. FIGS. 4A–4C depict three different convex reflective shields which may be implemented in the photoemission radiant heater in accordance with the principles of the present invention. FIG. 4A depicts a large radius convex reflective shield while FIG. 4B depicts a shorter radius reflective shield, and FIG. 4C an intermediate length radius reflective shield. The particular reflective shield used will be dependent upon the configuration of the black body radiator 3 in relation to the reflective chamber 4 as well as the diameter of the chamber 4.

Figure 5:
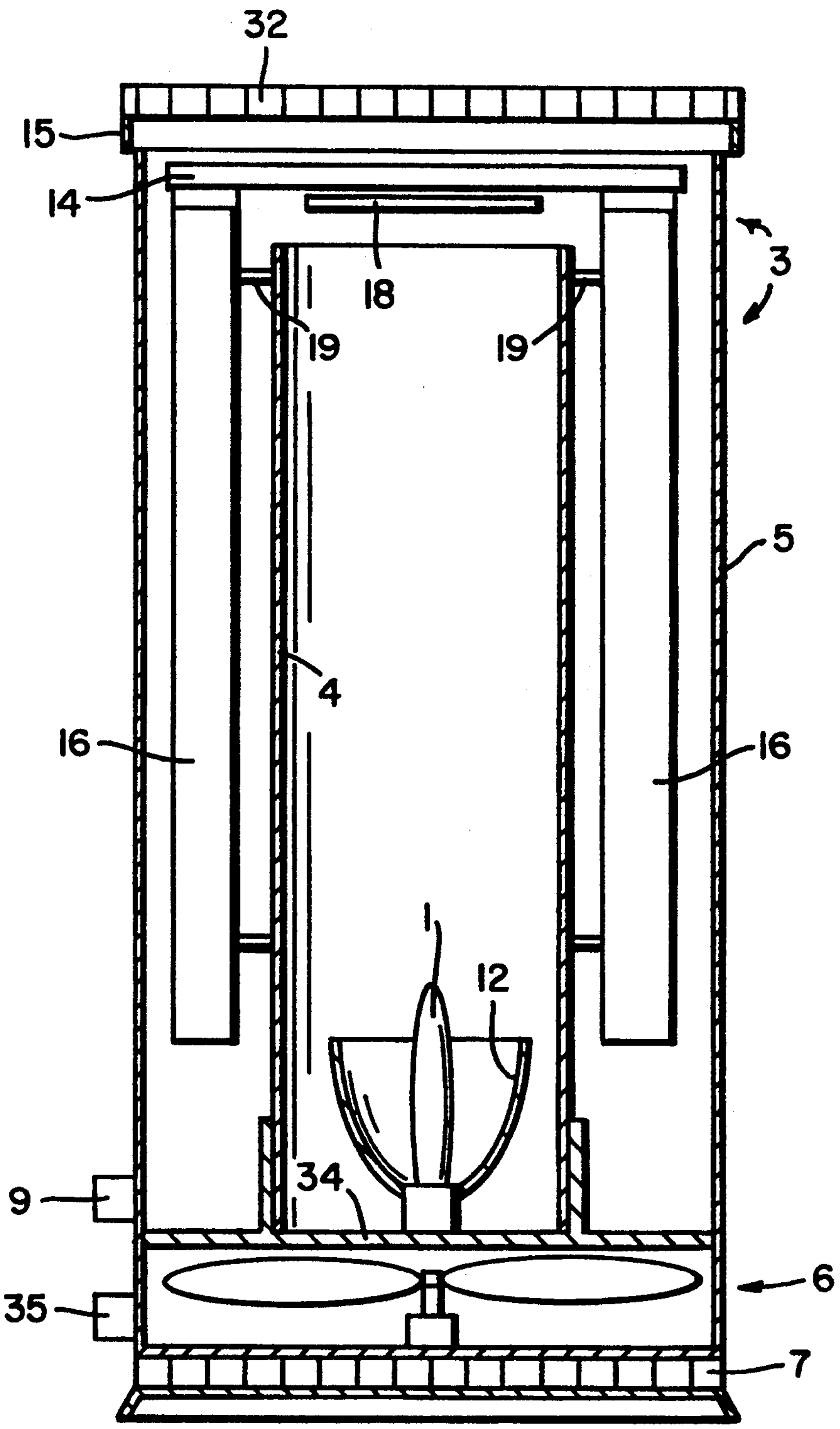
FIG. 5 depicts a sectional view of yet an alternative embodiment of the photoemission radiant heater in accordance with the principles of the present invention.
Figure 6:
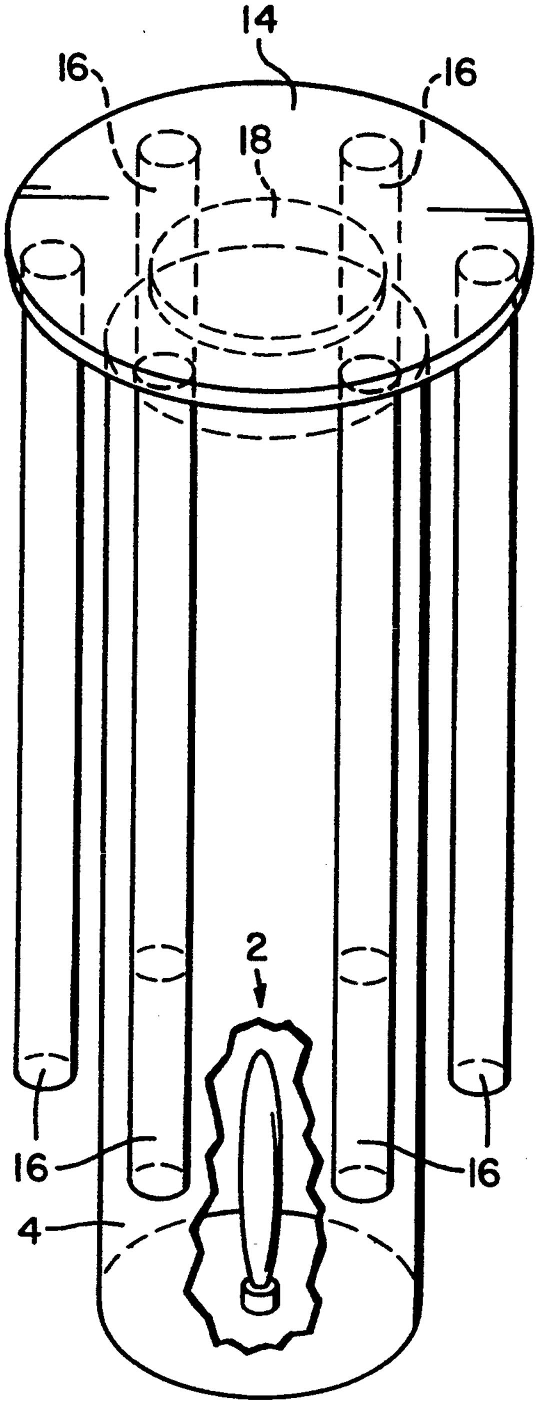
FIG. 6 depicts a schematic representation of the black body elements and reflective chamber of the photoemission radiant heater depicted in FIG. 5.

FIG. 5 depicts yet another embodiment of the photoemission radiant heater in accordance with the principles of the present invention. In this embodiment, the black body assembly 3 is located outside of the reflective chamber 4 and the light source 1 is located at the lower, or second, end of the reflective chamber 4. The black body assembly 3 typically contains a steel or cast iron disc receiver 18, located below a disc shaped member 14, at a first end of the reflective chamber 4. The receiver 18 is preferably shaped similar to the circumference of the reflective chamber 4, i.e., disk shaped to receive all of the radiant energy reflected off the reflective chamber. Oriented about the circumference of the disc shaped member 14 are a plurality of cylindrical members 16 (shown in greater detail in FIG. 6) which extend axially along the outer side of the reflective chamber 4 and are connected thereto by a plurality of support rods 19. Typically, the disc shaped member 14 and cylindrical members 16 of the black body assembly are made of aluminum. However, other materials may suffice. In this embodiment, there are no obstructions within the metallic chamber to prevent the propagation of radiant energy from the light source reflected off the metallic chamber 4 to the disc shaped members 18 and 14. Optimum radiant energy is absorbed by the black body assembly 3.

An outer housing 5 surrounds the black body assembly and reflective chamber 4. A fan assembly 6 located, preferably, at the bottom of the housing 5 will then draw air from the upper manifold 32 into the housing. The air will then flow over the black body assembly, and particularly the cylindrical members 16 thereby drawing thermal energy from the black body, and heated air will be blown through the lower manifold 7. In this configuration, air is blown outside of the chamber 4 over the cylindrical members. Air may be prevented from flowing through the core of the chamber 4 by a frame 34 which supports the light bulb 1 and concave shield 12.

Figure 7:
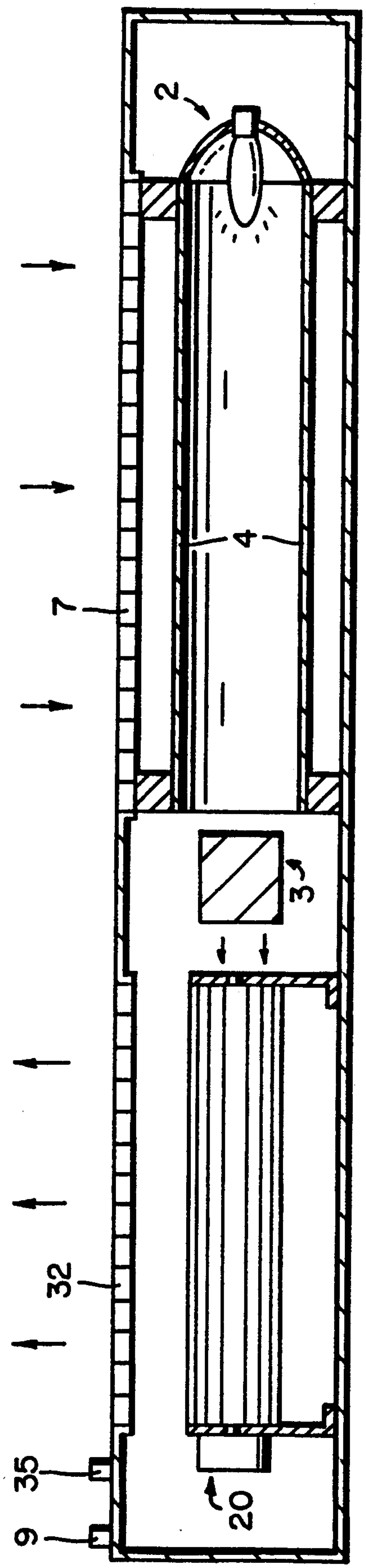
FIG. 7 depicts a cross sectional view of yet another embodiment of the photoemission radiant heater constructed in accordance with the principles of the present invention.

FIG. 7 depicts yet another alternative embodiment of the photoemission radiant heater, in accordance with the principles of the present invention, which may be used as a baseboard-type heater assembly. This embodiment includes the features in the embodiment previously discussed. In this configuration, the light assembly 2 is located at a first end of the reflective chamber 4 and a black body means 3 is located at the opposite end thereof. A blower assembly 20 is located near the black body assembly 3 to transfer thermal energy therefrom. Air flow from the heater is shown by the arrows. The black body assembly 20 is preferably a cast-iron or steel block. However, other materials may be used. The blower assembly is typically a radial blower unit as is well known in the art. Air is blown into manifold 7 and axially over the black body where it is heated before being radially discharged by the blower assembly out of the manifold 32. A thermostat 9 and fan control 35 may control the activation of the blower 20 and the speed thereof, respectively.

Although the subject invention has been described with regard to the embodiments disclosed herein, variations in the invention may be made without departing from the spirit of the invention. Any such variations are intended to be within the scope of the invention as defined by the following claims.

What is claimed is:

1. A photo emission radiant heater comprising:

an elongate and cylindrical reflective chamber having an interior reflective surface;

means for generating photons within the reflective chamber wherein photons are reflected off the interior reflective surface of said reflective chamber;

a black body means having a portion thereof located in a position to absorb radiant energy generated by the reflection of photons off the reflective surface of said reflective chamber; and means for blowing air over the black body means wherein heat is transferred from the black body means to the air.

2. The photoemission radiant heater of claim 1 further comprising a means for concentrating photons towards the black body means.

3. The photoemission radiant heater of claim 2 wherein the means for concentrating photons towards the black body means comprises a lense.

4. The photoemission radiant heater of claim 2 wherein the means for concentrating photons towards the black body means comprises a convex reflective shield.

5. The photoemission radiant heater of claims 2 or 4 wherein the black body means is located within the chamber.

6. The photoemission radiant heater of claims 2 or 4 wherein the black body means is located at a first end of the chamber.

7. The photoemission radiant heater of claims 2 or 4 wherein the black body means further comprises a second portion thereof located outside of the chamber.

8. The photoemission radiant heater of claim 7 wherein the second portion of the black body means located outside of the chamber comprises a plurality of members extending axially outside of the chamber.

9. The photoemission radiant heater of claim 8 wherein the black body means comprises a disk shaped member located at the first end of the chamber.

10. The photoemission radiant heater of claims 1 or 4 wherein the means for generating photons within the chamber comprises a light bulb.

11. The photoemission radiant heater of claim 10 wherein the light bulb is located towards a second end of the chamber.

12. The photoemission radiant heater of claim 1 wherein the black body means comprises a polymer filled black body.

13. The photoemission radiant heater of claim 1 further comprises a means for regulating blowing air over the black body means.

14. The photoemission radiant heater of claim 9 further comprising one of a steel or cast iron receiver affixed to the disk shaped member.

15. The photoemission radiant heater of claim 8 wherein said members comprise aluminum rods.

* * * * *